No. 854,443. PATENTED MAY 21, 1907.
J. K. & J. R. VOORHEES.
GRAIN ASSORTER.
APPLICATION FILED FEB. 23, 1906.

2 SHEETS—SHEET 1.

Inventors
John K. Voorhees, and
John R. Voorhees.

Witness
J. F. Albrecht
C. M. Jensen by
G. C. Kennedy, Attorney

No. 854,443. PATENTED MAY 21, 1907.
J. K. & J. R. VOORHEES.
GRAIN ASSORTER.
APPLICATION FILED FEB. 23, 1906.
2 SHEETS—SHEET 2.
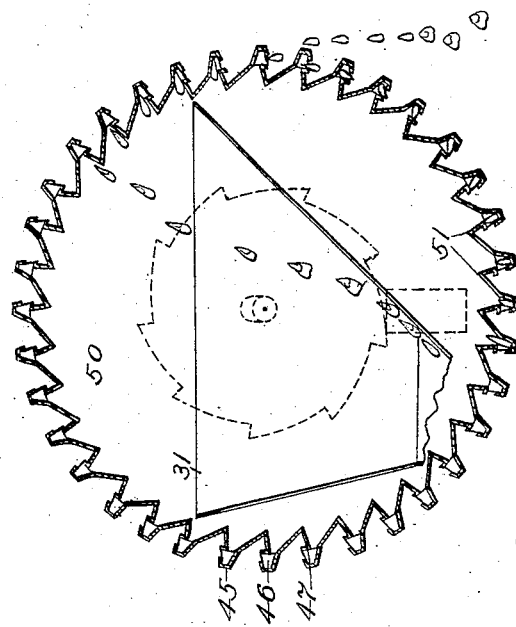
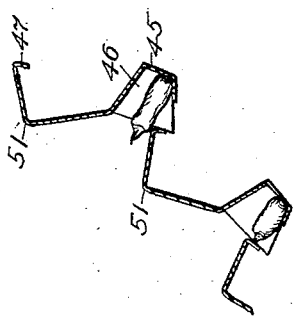
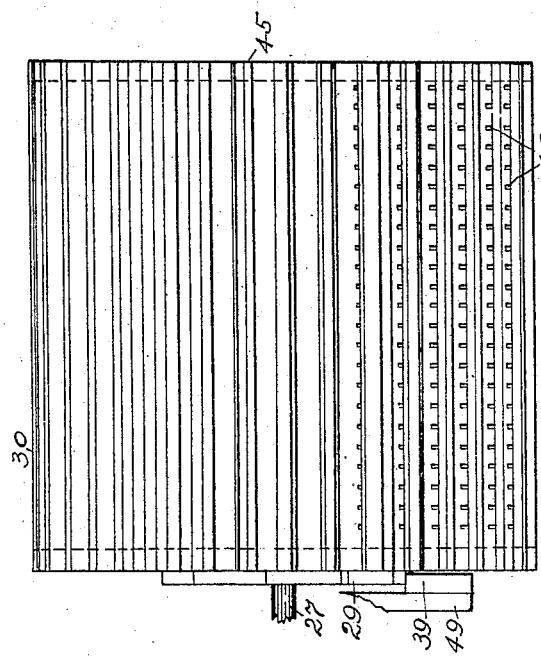
John K. Voorhees, and
John R. Voorhees.

UNITED STATES PATENT OFFICE.

JOHN K. VOORHEES AND JOHN R. VOORHEES, OF CEDAR FALLS, IOWA.

GRAIN-ASSORTER.

No. 854,443.  Specification of Letters Patent.  Patented May 21, 1907.

Application filed February 23, 1906. Serial No. 302,349.

*To all whom it may concern:*

Be it known that we, JOHN K. VOORHEES and JOHN R. VOORHEES, citizens of the United States of America, and residents of Cedar Falls, Blackhawk county, Iowa, have invented certain new and useful Improvements in Grain-Assorters, of which the following is a specification.

Our invention relates to grain assorters, and the object of our invention is to provide an apparatus for separating and grading shelled seed corn into its several sizes, according to the thickness and length of the kernels, for more convenient planting and to insure more uniform number of kernels in a hill. This object we have accomplished by the mechanism which is hereinafter described and claimed, and which is illustrated in the accompanying drawings, in which—

Figure 2:
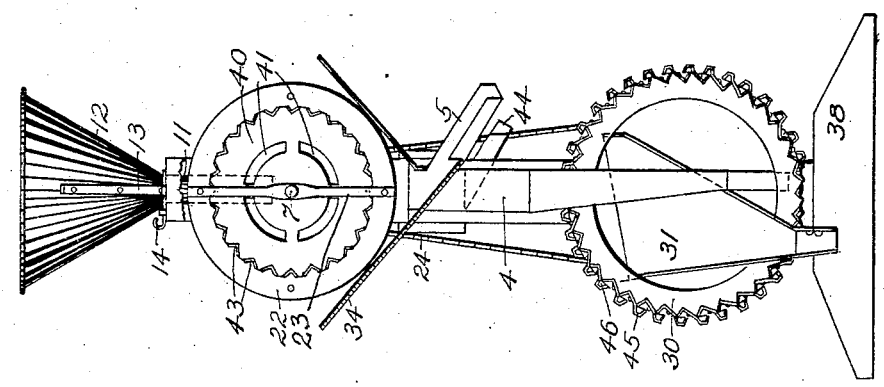
Figure 1:
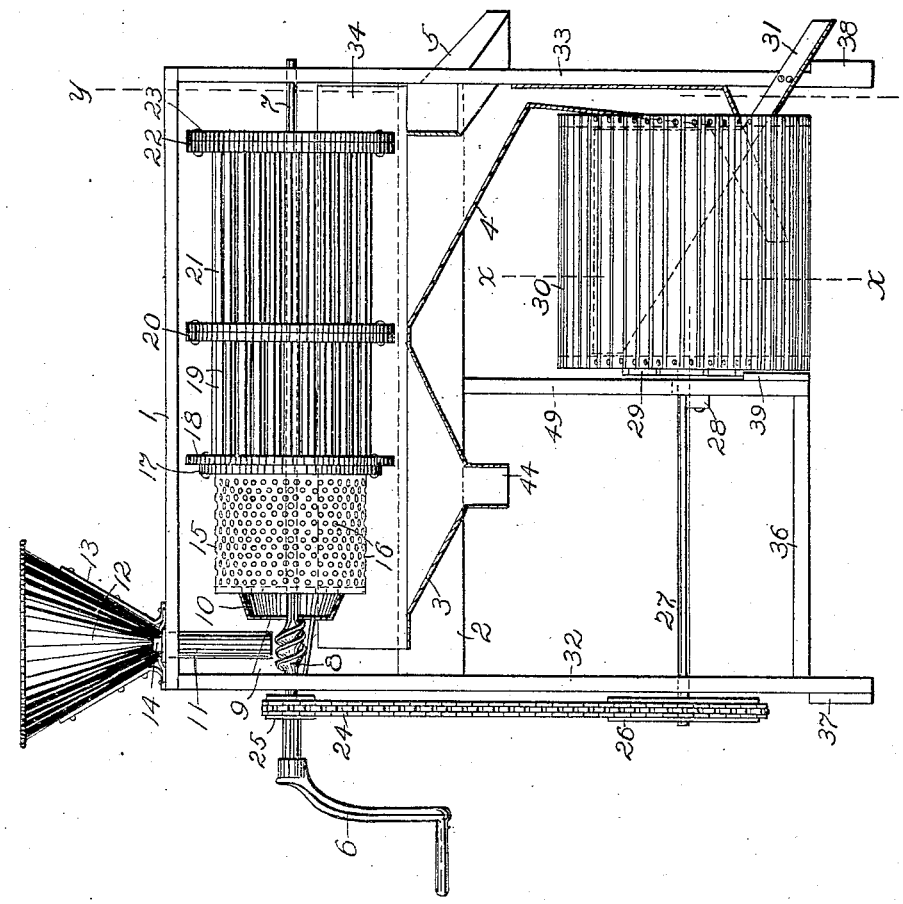

Figure 1 is a side elevation of our improved grain assorter, Fig. 2 is an end elevation thereof, partly sectioned along the line *y y* in Fig. 1, Fig. 3 is a side elevation, on a larger scale, of the lower drum containing the assorting pockets, Fig. 4 is a vertical transverse section of the same, along the line *x x* in Fig. 1, and Fig. 5 is a detail, on a larger scale, showing the assorting pockets aforesaid, and Fig. 6 is a detail sectional view of the same, illustrating the selective separating process of the assorting pockets.

Similar reference numerals refer to similar parts throughout the several views.

Our apparatus is contained within a frame, composed of end uprights 32 and 33, a top cross-bar 1, intermediate horizontal cross-bars 2, a bracket 36, 49, and transverse feet 37 and 38 on the lower ends of the end uprights 32 and 33. In the upper part of said frame, a shaft 7 is rotatably mounted in the uprights 32 and 33, said shaft being furnished with a crank 6 and small sprocket-wheel at one end without the frame. A shaft 27 is rotatably mounted in the upright 32 and the bracket upright 49, and has at its outer end a large sprocket-wheel 26, a sprocket-chain 24 passing about both said sprocket-wheels. The shaft 7 has a worm 8 mounted on it just inside the upright 32, while immediately above said worm is an open ended tube 11 in communication with the funnel or hopper 12 on the cross-bar 1. The hopper is supported by braces 13, and its open lower end may be closed when desired by means of the slide 14.

A series of drums are horizontally mounted about the shaft 7 within the frame, supported by means of the disk 40 and the cross-bar 23. The separating drum 15 nearest the worm 8, is furnished with a large number of small perforations, large enough however to permit egress therethrough of the smallest kernels of corn. The perforations 16 may be staggered as shown, or otherwise arranged, as considered desirable. The disk 40 has openings 41, for the passage of the entering corn, the latter moving therein from the chamber 10 affixed to the outer side of said disk, and in communication with said openings 41. The outer end of the chamber 10 has a round opening, into which is inserted one end of an inclined trough 9, the worm 8 rotating within the center of said trough. The annulus 18 is fastened to the annulus 17, removably, and the annulus 22 is supported by the cross-bar 23. The annulus 17 is connected to the inner end of the perforated drum 15, while between the annulus 18 and the annulus 22 at an intermediate point the annulus 20 is supported by means of the connecting strips 19 and 21. The strips 19 are wider than the strips 21, and are horizontally placed, with narrower interstices than are the interstices between the strips 21. Both the strips 19 and 21, are rectangular in cross section, and are mounted so as to have the apices of their angles inward.

Supported by the side-bars 2, are the chutes 44, 4, and 5, the first-named as well as the second leading from the general trough 34. The chute 44 receives the corn which is separated in the drums 15 and 19 and which passes through the perforations and interstices thereof, while the chute 4 receives the kernels which pass through the interstices of the strips 21. Whatever kernels do not pass through the sides of the aforesaid drums, move out of the end of the annulus 22 and fall into the chute 5.

The chute 4 has a downwardly turned portion which is bent inwardly so as to deliver inside of the assorting lower drum. This lower drum is fixed to the end of the shaft 27, between the uprights 33 and 49. Affixed to the drumhead 50 is a ratchet 29, whose teeth slide over a buffer-block 39 attached to the lower end of the upright 49. The upright 49 through which the shaft 27 passes is vertically slotted to form a bearing for the end of said shaft nearest said ratchet, to permit the drum to vertically oscillate when the teeth of the ratchet jump along the buffer-block.

A chute 31 is fastened to the lower portion of the upright 33, and has an upwardly inclined hopper which extends into the interior of the assorting drum 30, having a function to be hereinafter described.

The assorting drum consists of an annulus 30 connected to the drumhead 50 by horizontal and parallel reversely crimped plates whose reversed angles 45 and 47 are arranged so as to be opposite each other. The bent end of the plate at 45 has a trough shape, and contains the separating device forming assorting pockets, consisting of a strip 48 crimped into divisions 46, spaced a sufficient distance apart and arranged in parallel. As shown in Figs. 5 and 6, when the plates have been properly assembled together about the drum, a series of assorting pockets is thus formed, whose function will be hereinafter described.

The angle between the ends of said plate, at 51, which extends toward the interior of the drum, is effective in causing any kernels falling against the inner surface of the drum to certainly seek out the assorting pockets between the divisions 46. The angle 47 is effective in preventing any kernels which have issued through the pockets and their outer openings from sliding back into an adjacent pocket, or a pocket in same trough, as the tilted edge of said angle prevents any recession of the kernels.

The operation of my device is as follows: When a supply of shelled corn has been placed in the hopper 12, the slide 14 removed, and the crank 6 rotated at a moderate rate of speed, the worm 8 will deflect any grains falling upon it into the chamber 10, whence the kernels issue through the openings 41 in the drumhead 40, into the perforated drum 15. The rotation of this drum causes the small, undeveloped and inferior kernels to pass through the perforations 16, thence into the chute 44. The rest of the corn proceeds into the separating devices mounted between the annulus 17 and the annulus 20. The interstices being narrow in this compartment, the thin inferior kernels are sorted out and drop through such interstices into the same chute 44. The corn which moves into the part of the separator which lies between the annulus 20 and the annulus 22, is separated as follows. The thick and inferior kernels pass out of the open annulus 22 and drop into the chute 5, while the kernels of medium thickness pass into the interstices between the strips 21, of somewhat greater width, and are deposited in the chute 4, whence they are carried by gravity into the interior of the assorting drum 30. The annuli 18 and 22, having their circumferential separated angularly bent strips 21 arranged about them to form separating cylinders, when kernels of corn pass thereinto, said kernels being flat end to lie on their flat sides, but are prevented from imperfect separation on account of riding out of said cylinders over each others flat sides, by reason of the tilting over action upon them of the strips 21. Such strips tend to catch up and carry the kernels a short ways during the rotation of the cylinders, and thus cause them to either pass through the peripheral interstices or else to turn over and drop again into the interior where the process is continually repeated as long as kernels remain which will pass through such interstices. The object of the use of the assorting drum 30, is to arrange and separate the short from the long kernels. A special use of such separation is in thereby furnishing seed of even thickness and length to be used in that variety of planters which drop a predetermined number of kernels in a hill by the use of drop plates. Inferior thin or thick seeds, could not be dropped by the drop-plates of such planters, as it is essential to their effectiveness that the kernels be of even length and thickness. Our assorting drum 30 assorts the kernels as to length in the following manner. When the kernels strike the angles 51 in falling, and are thus positively deflected into the pockets, one kernel finds a place in one pocket. As the assorting drum rotates, with an oscillating motion due to the ratchet 29, the kernel, if short, will assume the position shown in the lower pocket of Fig. 6, and, as it is not arrested by the angle 47, its upper end will approach the outer opening of the pocket, and when the rotation has proceeded far enough, the kernel will drop through the drum, but in case the kernel should not pass through the drum soon enough and then not fall off from the slat and should be carried around with the drum, the flange 47 will catch it and prevent it from falling back into a pocket again. As will be seen by referring to the upper pocket in Fig. 6, a long kernel will project upward beyond the angle 47, and being longer than the space between said angle and the trough 45, cannot escape through the outer opening of the pocket, but will, when the rotation of the drum has proceeded far enough, slide out of the pocket into the interior of the drum, falling into the hopper at the upper end of the chute 31, as will be clearly seen by referring to Fig. 4. In this way, all the short kernels are assorted out of the drum through the exterior openings of the pockets, while the longer kernels are deflected into the hopper 31 and escape through the open end of the drum. The action of the worm feed at 8 is especially desirable in that a regular feed is thereby established. The oscillatory movement of the assorting drum is of value in that it causes the short kernels to more rapidly pass into the pockets and through them quicker than would otherwise be the case, and the long kernels are caused to fall back out of the pockets at the right time. The arrangement of the angular strips 19 and 21, with their angles turned inward, aids in preventing the kernels from sliding over the interstices, and so hastens the process, in the upper separating drums.

It will be obvious, that our assorting drum, by simply varying the dimensions of the assorting pockets, may be successfully used in separating the long kernels of oats from the short kernels of wheat in mixture, or in separating the long kernels of any kind of grain from the short kernels when mixed together, without in any way departing from the principles involved in this invention.

Having described our invention, what we claim as new, and desire to secure by Letters Patent, is—

1. A device of the character described, comprising a rotatable assorting drum having longitudinal reversely crimped peripheral slats spaced apart, provided with inner troughs, and division contrivances suitably placed in said troughs to form a series of open separating pockets.

2. A device of the character described, comprising a rotatable assorting drum having longitudinal reversely crimped peripheral slats spaced apart, provided with inner troughs, division contrivances in said troughs suitably arranged to form a series of open separating pockets, and a hopper supported within said drum.

3. A device of the character described, comprising a rotatable assorting drum having longitudinal reversely crimped peripheral slats spaced apart, provided with inner troughs, division contrivances suitably placed in said troughs to form a series of open separating pockets, and suitable means for oscillating said drum.

4. A device of the character described, comprising a rotatable assorting drum having longitudinal reversely crimped peripheral slats spaced apart, provided with inner troughs, division contrivances suitably placed in said troughs to form a series of open separating pockets, a hopper within said drum, and suitable means for oscillating said drum.

5. A device of the character described, comprising a rotatable assorting drum having longitudinal reversely crimped peripheral slats spaced apart, provided with inner troughs, division contrivances suitably placed in said troughs to form a series of open separating pockets, a hopper within said drum, and suitable means for rotating and for oscillating said drum.

6. A device of the character described, comprising a rotatable assorting drum having longitudinal reversely crimped peripheral slats spaced apart, provided with inner troughs and having inwardly directed deflecting angles, division contrivances suitably placed in said troughs to form a series of open separating pockets, a hopper within said drum, and suitable means for rotating said drum.

7. A device of the character described, comprising a rotatable assorting drum, having longitudinal reversely crimped peripheral slats spaced apart, provided with inner troughs, and having tangentially outwardly directed flanges arranged to prevent return of separated kernels into the assorting pockets, and division contrivances suitably placed in said troughs to form a series of open separating pockets.

8. A device of the character described, comprising a rotatable assorting drum having longitudinal reversely crimped peripheral slats spaced apart, provided with inner troughs, also having inwardly directed deflecting angles and having tangentially outwardly directed flanges arranged to prevent return of separated kernels into the assorting pockets, and division contrivances suitably placed in said troughs to form a series of open assorting pockets.

9. A device of the character described, comprising a rotatable assorting drum having longitudinal peripheral slats provided with inner troughs, also having tangentially outwardly directed flanges arranged to prevent return of separated kernels into the assorting pockets, the tangential flanges being spaced a predetermined distance from the bottom of said troughs, and division contrivances in said troughs to form assorting pockets.

10. A device of the character described, comprising a rotatable separating drum having open heads, having parallel longitudinal peripheral slats spaced apart, the said slats being longitudinally crimped with the angles inwardly directed, and a screw-feeding device in communication with the interior of said drum.

11. A device of the character described, comprising a pair of rotatable separating drums with open heads and in communication with each other, said drums having parallel longitudinally crimped peripheral slats spaced apart, their angles being inwardly directed, the interstices between the slats of one drum being narrower than the interstices between the slats of the other drum, and suitable means for rotating said drums.

12. A device of the character described, comprising a pair of rotatable separating drums with open heads and in communication with each other, said drums having parallel longitudinally crimped peripheral slats spaced apart, their angles being inwardly directed, the interstices between the slats of one drum being narrower than the interstices between the slats of the other drum, a screw-feeding device in communication with the interior of said drums, and suitable means for rotating said drums.

13. A device of the character described, comprising a pair of rotatable separating drums with open heads and in communication with each other, said drums having parallel longitudinally crimped peripheral slats spaced apart, their angles being inwardly directed, the interstices between the slats of one drum being narrower than the interstices between the slats of the other drum, a rotatable open headed drum having a plurality of peripheral perforations and in communication with the other drums, and suitable means for rotating said drums.

14. A device of the character described, comprising a pair of rotatable separating drums with open heads and in communication with each other, said drums having parallel longitudinally crimped peripheral slats spaced apart, their angles being inwardly directed, the interstices between the slats of one drum being narrower than the interstices between the slats of the other drum, a rotatable open headed drum having a plurality of peripheral perforations and in communication with the other drums, a screw-feeding device in communication with the interior of said drums, and suitable means for rotating said drums.

15. A device of the character described, comprising a rotatable separating drum having open heads and parallel longitudinal peripheral slats spaced apart, the said slats being longitudinally crimped with the angles inwardly directed, a rotatable open headed drum having a plurality of peripheral perforations and in communication with the other drum, and suitable means for rotating said drums.

16. A device of the character described, comprising a rotatable separating drum having open heads and parallel longitudinal peripheral slats spaced apart, the said slats being longitudinally crimped with the angles inwardly directed, a rotatable open headed drum having a plurality of peripheral perforations and in communication with the other drum, a screw-feeding device in communication with the interior of said drums, and suitable means for rotating said drums.

17. A device of the character described, comprising a pair of rotatable separating drums with open heads and in communication with each other, said drums having parallel longitudinally crimped peripheral slats spaced apart, their angles being inwardly directed, the interstices between the slats of one drum being narrower than the interstices between the slats of the other drum, a rotatable open headed drum having a plurality of peripheral perforations and in communication with the other drums, and suitable means for conveying separated kernels to different receptacles.

18. A device of the character described, comprising a rotatable separating drum having open heads, and having parallel longitudinal peripheral slats spaced apart, the said slats being longitudinally crimped with the angles inwardly directed, and a rotatable assorting drum having peripheral openings, and assorting pockets in said drum in communication with said openings and the interior of the drum, and suitable means of communication between said drums.

19. A device of the character described, comprising a rotatable separating drum having open heads, and having parallel longitudinal peripheral slats spaced apart, the said slats being longitudinally crimped with the angles inwardly directed, a rotatable assorting drum having peripheral openings, assorting pockets in said drum in communication with said openings and the interior of the drum, a hopper supported within said drum, suitable means for rotating said drums, and suitable means of communication between said drums.

20. A device of the character described, comprising a rotatable separating drum having open heads, and having parallel longitudinal peripheral slats spaced apart, the said slats being longitudinally crimped with the angles inwardly directed, a rotatable assorting drum having peripheral openings, assorting pockets in said drum in communication with said openings and the interior of the drum, a hopper supported within said drum, means for oscillating said drum, means of communication between said drums, and suitable means for rotating said drums.

21. A device of the character described, comprising a rotatable separating drum having open heads, and having parallel longitudinal peripheral slats spaced apart, the said slats being longitudinally crimped with the angles inwardly directed, a screw-feeding device in communication with the interior of said drum, a rotatable assorting drum having peripheral openings, assorting pockets in said drum in communication with said openings and the interior of the drum, and suitable means of communication between said drums.

22. A device of the character described, comprising a pair of rotatable separating drums with open heads and in communication with each other, said drums having parallel longitudinally crimped peripheral slats spaced apart, their angles being inwardly directed, the interstices between the slats of one drum being narrower than the interstices between the slats of the other drum, a rotatable assorting drum having peripheral openings, assorting pockets in said drum in communication with said openings and the interior of the drum, and suitable means of communication between said drums.

23. A device of the character described, comprising a pair of rotatable separating drums with open heads and in communication with each other, said drums having parallel longitudinal peripheral slats spaced apart, their angles being inwardly directed, the interstices between the slats of one drum being narrower than the interstices between the slats of the other drum, a screw-feeding device in communication with the interior of said drums, a rotatable assorting drum having peripheral openings, assorting pockets in said drum in communication with said openings and the interior of the drum, and suitable means of communication between said drums.

24. A device of the character described, comprising a pair of rotatable separating drums with open heads and in communication with each other, said drums having parallel longitudinally crimped peripheral slats spaced apart, their angles being inwardly directed, the interstices between the slats of one drum being narrower than the interstices between the slats of the other drum, a rotatable open headed drum having a plurality of peripheral perforations, a rotatable assorting drum having peripheral openings, assorting pockets in said drum in communication with said openings and the interior of the drum, and suitable means of communication between said drums.

25. A device of the character described, comprising a pair of rotatable separating drums with open heads and in communication with each other, said drums having parallel longitudinally crimped peripheral slats spaced apart, their angles being inwardly directed, the interstices between the slats of one drum being narrower than the interstices between the slats of the other drum, a rotatable open headed drum having a plurality of peripheral perforations, a rotatable assorting drum having peripheral openings, assorting pockets in said drum in communication with said openings and interior of the drum, suitable means of communication between said drums, and a screw-feeding device in communication with the interior of said drums.

26. A device of the character described, comprising a pair of rotatable separating drums with open heads and in communication with each other, said drums having parallel longitudinally crimped peripheral slats spaced apart, their angles being inwardly directed, the interstices between the slats of one drum being narrower than the interstices between the slats of the other drum, a rotatable open headed drum having a plurality of peripheral perforations, a rotatable assorting drum having peripheral openings, assorting pockets in said drum in communication with said openings and the interior of the drum, means for oscillating said drum, a hopper within said drum, suitable means of communication between said drums, and suitable means for rotating said drums.

Signed at Waterloo, Iowa, this 3rd day of Feb. 1906.

JOHN K. VOORHEES.
JOHN R. VOORHEES.

Witnesses:
G. C. KENNEDY,
M. E. KENNEDY.